(12) United States Patent
Igumnov et al.

(10) Patent No.: US 10,386,196 B2
(45) Date of Patent: Aug. 20, 2019

(54) METHOD OF AND SYSTEM FOR DETERMINING ROUTE SPEED OF A MOBILE NAVIGATION UNIT MOVABLE ALONG A ROUTE SEGMENT OF A ROUTE HAVING A PLURALITY OF INTERSECTIONS

(71) Applicant: MOTOROLA SOLUTIONS, INC, Chicago, IL (US)

(72) Inventors: Alexei Vladimirovich Igumnov, St. Petersburg (RU); Fedor Grigorievich Saveliev, St. Petersburg (RU)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 216 days.

(21) Appl. No.: 15/323,976

(22) PCT Filed: Aug. 19, 2014

(86) PCT No.: PCT/RU2014/000617
§ 371 (c)(1),
(2) Date: Jan. 5, 2017

(87) PCT Pub. No.: WO2016/028184
PCT Pub. Date: Feb. 25, 2016

(65) Prior Publication Data
US 2017/0199048 A1    Jul. 13, 2017

(51) Int. Cl.
*G01C 21/34* (2006.01)
*G01C 21/32* (2006.01)
(Continued)

(52) U.S. Cl.
CPC ......... *G01C 21/3492* (2013.01); *G01C 21/32* (2013.01); *G01C 21/3676* (2013.01); *G01C 21/3691* (2013.01); *G01S 19/52* (2013.01)

(58) Field of Classification Search
CPC ............ G01C 21/3492; G01C 21/3676; G01C 21/3691; G01C 21/32; G01S 19/52
(Continued)

(56) References Cited

U.S. PATENT DOCUMENTS 6,128,571 A * 10/2000 Ito ...................... G01C 21/3679
340/995.24
7,576,661 B2    8/2009 Mochizuki
(Continued)

FOREIGN PATENT DOCUMENTS

WO    2004061737 A1    7/2004
WO    2007067841 A2    6/2007
(Continued)

OTHER PUBLICATIONS

The International Search Report and the Written Opinion, SN: PCT/RU2014/000617, filed Aug. 19, 2014, all pages.

*Primary Examiner* — Muhammad Shafi
(74) *Attorney, Agent, or Firm* — Daniel R. Bestor (57) ABSTRACT

The route speed of a mobile global positioning satellite (GPS) navigation unit in a vehicle movable along one of a plurality of available route segments of a route having a plurality of intersections, is determined by locating a first and a second of the intersections, by locating a start boundary point, by locating a plurality of end boundary points for all the route segments, and by receiving geographic location information of the vehicle at an initial trajectory point located past the start boundary point, and a subsequent trajectory point past the end boundary point in the one route segment into which the vehicle moved. The trajectory points are associated with trajectory times. A server determines the route speed of the one route segment by dividing a differential distance between the trajectory points by a differential time between the trajectory times. The route speed of the (Continued)

other route segments is likewise determined to aid in route optimization.

12 Claims, 4 Drawing Sheets (51) Int. Cl.
*G01C 21/36* (2006.01)
*G01S 19/52* (2010.01)

(58) Field of Classification Search
USPC ......................................................... 701/430
See application file for complete search history.

(56) References Cited

U.S. PATENT DOCUMENTS

| | | |
|---|---|---|
| 7,593,809 B2 | 9/2009 | Rosen et al. |
| 7,667,618 B2 | 2/2010 | Chitor et al. |
| 8,255,145 B2 | 8/2012 | Murata et al. |
| 8,655,575 B2 | 2/2014 | Reghunath |
| 2007/0038362 A1 | 2/2007 | Gueziec |
| 2012/0001770 A1* | 1/2012 | Oh ........................ G08G 1/0112 340/905 |
| 2012/0029800 A1 | 2/2012 | Kluge et al. |

FOREIGN PATENT DOCUMENTS

| | | | |
|---|---|---|---|
| WO | 2009158211 A2 | | 12/2009 |
| WO | WO-2009/158211 | * | 12/2009 |
| WO | 2012089282 A1 | | 7/2012 |

* cited by examiner

METHOD OF AND SYSTEM FOR DETERMINING ROUTE SPEED OF A MOBILE NAVIGATION UNIT MOVABLE ALONG A ROUTE SEGMENT OF A ROUTE HAVING A PLURALITY OF INTERSECTIONS

FIELD OF THE DISCLOSURE

The present disclosure relates generally to a method of, and a system for, determining the route speed of a mobile global positioning satellite (GPS) navigation unit movable along one of a plurality of available route segments of a route having a plurality of intersections, and, more particularly, for determining an optimal route comprised of a plurality of route segments leading to a destination by selecting the minimum total route time calculated as a sum of route times of the route segments, each route time being calculated by dividing the length of each route segment by an average determined route speed of other navigation units that previously moved through that route segment between a pair of first and second intersections for each route maneuver available at the second intersection.

BACKGROUND

Mobile global positioning satellite (GPS) navigation units are integrated in many portable smartphones that are operated by users riding in vehicles, or are sometimes configured as portable, dedicated, stand-alone, navigation units that are removably mounted in the vehicles, or are sometimes configured as built-in navigation units permanently installed in the vehicles. As is conventional, each such navigation unit is operative for locating a real-time position or current geographic location of a vehicle with triangulation techniques utilizing a plurality of orbiting satellites, and for displaying a map in the environment around the vehicle and/or turn-by-turn directions, together with the real-time position of the vehicle based on map information that is stored in advance. Prior to a trip, the navigation unit typically searches for, and displays, an optimal route to a destination, and provides traveling directions or route maneuvers, such as make a right turn, make a left turn, or go straight (make no turn) before the vehicle reaches each intersection or crossroads of the route. The navigation unit typically estimates the arrival time to the destination based on various factors, such as toll avoidance, street and highway posted speed limits, the total length of the route, etc.

Figure 1:
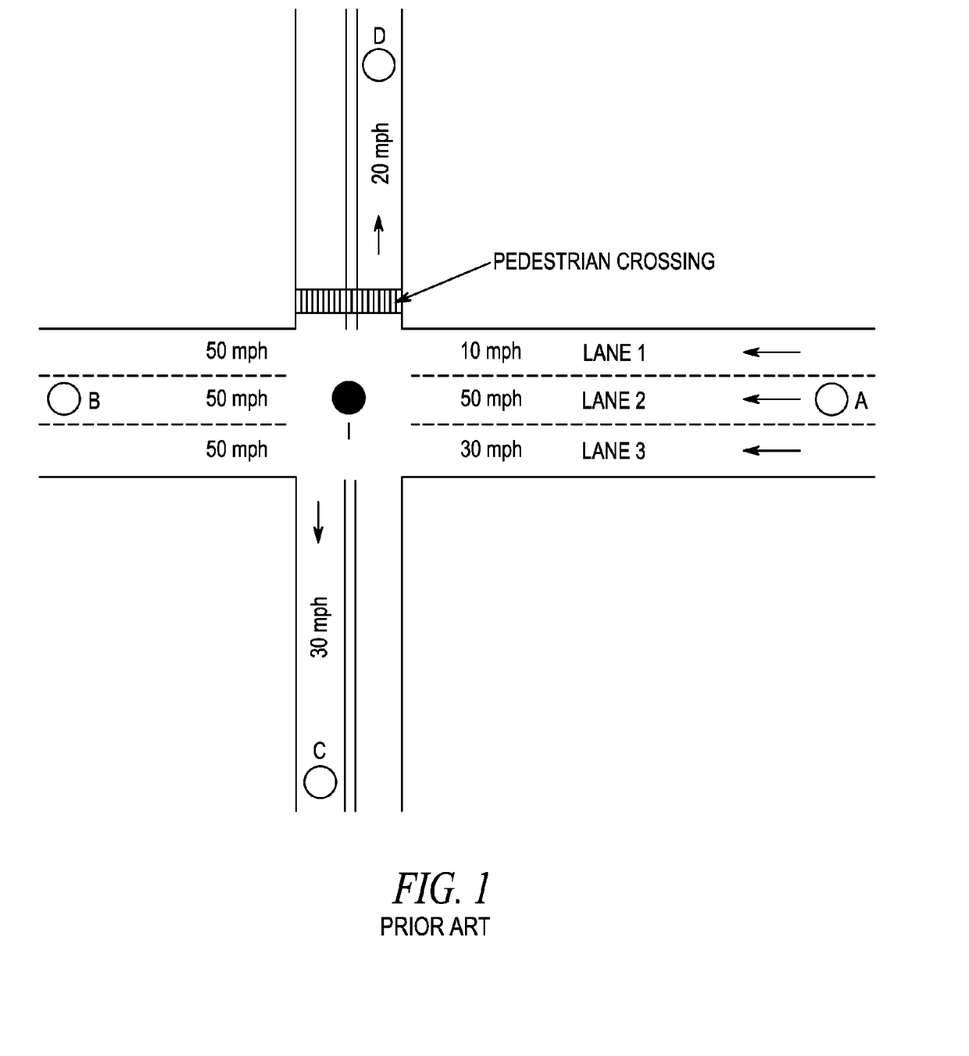
FIG. 1 is a diagrammatic view of a representative traffic intersection of a route, over which vehicle speed and the arrival time to a destination are accurately determined in accordance with the present disclosure.

As advantageous as such navigation units are, the estimation of the arrival time could be improved, especially in the common situation depicted in FIG. 1, wherein a vehicle at point A is traveling, for example, at a posted speed limit of 50 mph, along a route or highway having a plurality of lanes, e.g., lane 1, lane 2, and lane 3, toward an intersection I. If the vehicle wishes to make a right turn at the intersection I, then the vehicle enters lane 1 and, as shown, the vehicle speed may, for example, be slowed down to 10 mph to avoid any pedestrians in the illustrated pedestrian crossing, after which the vehicle may accelerate to a speed of 20 mph and proceed toward the point D. If the vehicle wishes to make a left turn at the intersection I, then the vehicle enters lane 3 and, as shown, the vehicle speed may, for example, be slowed down to 30 mph, after which the vehicle may continue at the speed of 30 mph and proceed toward the point C. If the vehicle does not wish to make a turn at the intersection I, but instead, wishes to go straight through the intersection I, then no matter which lane the vehicle is in, it continues at the same speed of 50 mph toward the point B.

Thus, as shown in FIG. 1, the vehicles in lanes 1, 2 and 3 have different actual speeds right before the intersection I. If the estimation of the arrival time is based on the posted speed limit of 50 mph, then it would not be accurate if the vehicle makes a turn at the intersection I. Alternatively, if the estimation of the arrival time is based on averaging all the actual speeds of all the lanes, i.e., 10+50+30=90/3=30 mph, then, again, the estimation of the arrival time to a destination would not be accurate, because the estimation is using an average speed calculated for all the lanes, and not the actual speeds in each of the various different lanes that are intended for different vehicle maneuvers at the intersection I.

Greater accuracy could be achieved by installing traffic speed sensors in each individual lane, but the extra components required by this solution is very costly to install and maintain. Relying on a GPS navigation unit itself to distinguish among the lanes is not available, because the GPS navigation unit does not have the required resolution to distinguish the location of one lane relative to another lane. Thus, it is not possible to precisely calculate the arrival time, or to optimize the shortest and quickest route to the destination without differentiating the different route speeds on different lanes intended for different vehicle maneuvers at the intersection I, which is of special interest to public safety (PS) personnel, such as first responders, who must respond to an emergency and must arrive at an incident scene along an optimal route as quickly as possible. Accordingly, there is a need to accurately estimate the arrival time, and optimize the route, to a destination, taking into consideration the different actual speeds in the lanes that are intended for different vehicle maneuvers at an intersection.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans and practitioners will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a method of determining route speed of a mobile global positioning satellite (GPS) navigation unit movable along one of a plurality of available route segments of a route having a plurality of intersections. A typical route has multiple route segments leading to a destination. The navigation unit may be integrated in a portable smartphone that is operated by a user, who is riding in, or operating, a vehicle, or is walking. The navigation unit may be a portable, dedicated, stand-alone, unit that is removably mounted in the vehicle, or may be a built-in unit permanently installed in the vehicle.

The method is performed by the step of locating a first of the intersections, a start boundary point for all the available route segments relative to the first intersection, a second of the intersections, and a plurality of end boundary points, one in each of the available route segments, relative to the second intersection. The method is further performed by the step of receiving geographic location information of the mobile navigation unit at an initial trajectory point located within a predetermined threshold distance past the located start boundary point, and at a subsequent trajectory point after the mobile navigation unit has moved past the second intersection into the one route segment. The method is still further performed by the step of associating the received subsequent trajectory point in the one route segment with an end boundary point located in the same one route segment. The received subsequent trajectory point is located within a predetermined threshold distance past the located end boundary point in the one route segment. An initial trajectory time is associated with the initial trajectory point, and a subsequent trajectory time is associated with the subsequent trajectory point. A differential trajectory distance is obtained between the subsequent and the initial trajectory points. A differential trajectory time is obtained between the subsequent and the initial trajectory times. The route speed of the one route segment is determined by dividing the differential trajectory distance by the differential trajectory time. The distance between the start boundary point and the end boundary point in the one route segment corresponds to the distance between the initial trajectory point and the subsequent trajectory point in the one route segment. Thus, the route speed of the navigation unit over the one route segment is accurately determined. When other navigation units move over the same one route segment, their route speeds are also accurately determined. All of these route speeds can be averaged, and the average route speed for that particular one route segment can be stored in a database for subsequent retrieval, for example, when planning an optimal route to a destination.

In addition, the above method steps are repeated for a plurality of other navigation units to obtain a plurality of determined route speeds for each of the available route segments, and then the plurality of determined route speeds are averaged to obtain an average route speed for each of the available route segments. An optimal route comprised of a plurality of route segments leading to a destination is determined by selecting the route having the minimum total route time calculated as a sum of the individual route times for the individual route segments, each individual route time for each individual route segment being calculated by dividing the length or distance of each individual route segment by the average route speed of the same individual route segment.

Another aspect of this disclosure relates to a system for determining route speed of a mobile global positioning satellite (GPS) navigation unit movable along one of a plurality of available route segments of a route having a plurality of intersections. The system comprises a server for locating a first of the intersections, a start boundary point for all the available route segments relative to the first intersection, a second of the intersections, and a plurality of end boundary points, one in each of the available route segments, relative to the second intersection. The system further comprises a transceiver for receiving geographic location information of the mobile navigation unit at an initial trajectory point located within a predetermined threshold distance past the located start boundary point, and at a subsequent trajectory point after the mobile navigation unit has moved past the second intersection into the one route segment. The server is operative for associating the received subsequent trajectory point in the one route segment with an end boundary point located in the same one route segment. The received subsequent trajectory point is located within a predetermined threshold distance past the located end boundary point in the one route segment. The server is also operative for associating an initial trajectory time with the initial trajectory point, and a subsequent trajectory time with the subsequent trajectory point; for obtaining a differential trajectory distance between the subsequent and the initial trajectory points; for obtaining a differential trajectory time between the subsequent and the initial trajectory times; and for determining the route speed of the one route segment by dividing the differential trajectory distance by the differential trajectory time.

Figure 2:
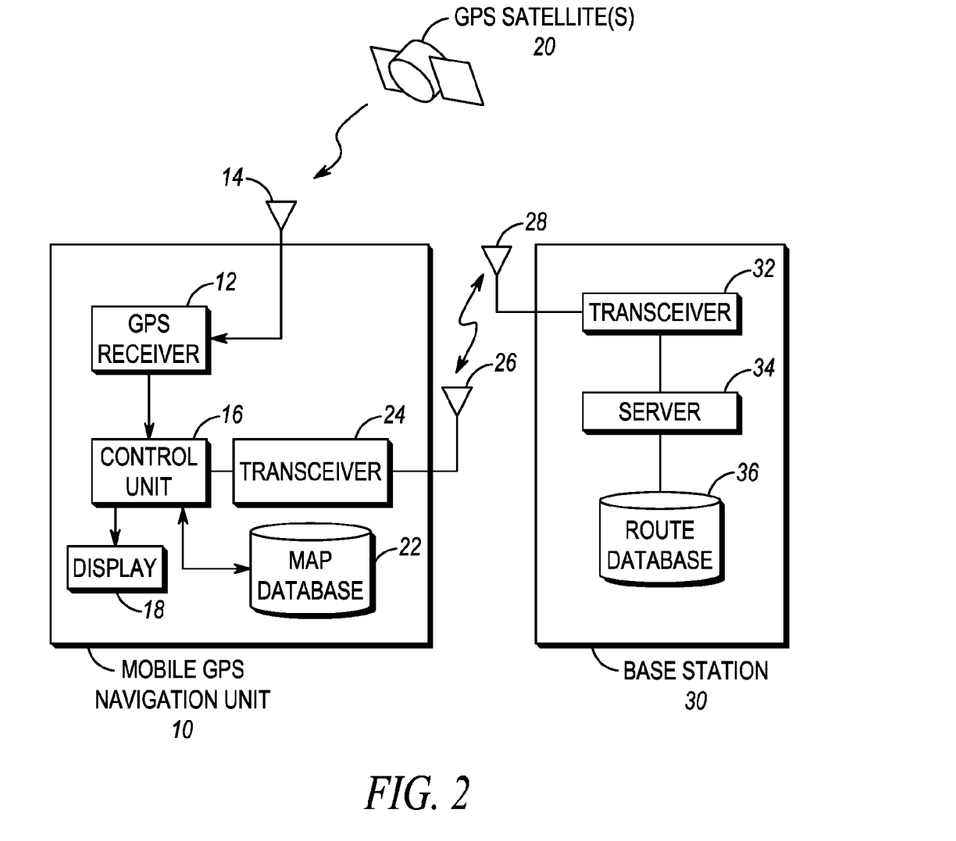
FIG. 2 is a block diagram depicting components of a system for determining the vehicle speed and the arrival time.

Turning now to the drawings, reference numeral 10 in FIG. 2 depicts a mobile global positioning satellite (GPS) navigation unit. The navigation unit 10 may be integrated in a portable smartphone that is operated by a user, who is riding in, or operating, a vehicle, or is walking. The navigation unit 10 may be a portable, dedicated, stand-alone, unit that is removably mounted in the vehicle, or may be a built-in unit permanently installed in the vehicle. The vehicle may be any manned or unmanned, engine-powered or manually-powered, form of transport, such as a car, truck, van, motorcycle, or bicycle.

The navigation unit 10 has a wireless GPS receiver 12 operative, with the aid of an antenna 14, for locating a real-time position or current geographic location of the vehicle with triangulation techniques utilizing a plurality of orbiting satellites 20, and for displaying on a display 18 a map around the vehicle and/or turn-by-turn directions, together with the real-time position of the vehicle based on map information that is stored in a map database 22 in advance. A wireless transceiver 24 sends geographic location information via antennas 26, 28 away from the navigation unit 10 to a wireless transceiver 32 in a remote base station 30. A control unit 16 or programmed microprocessor controls all the components in the navigation unit 10. A server 34 or programmed microprocessor controls the transceiver 32 and a route database 36 in the base station 30, as described below. Prior to a trip, the navigation unit 10 typically searches for, and displays, an optimal route to a destination on the display 18, and provides traveling directions or route maneuvers, such as make a right turn, make a left turn, or go straight (make no turn) before the vehicle reaches each intersection or crossroads of the route.

Figure 3:
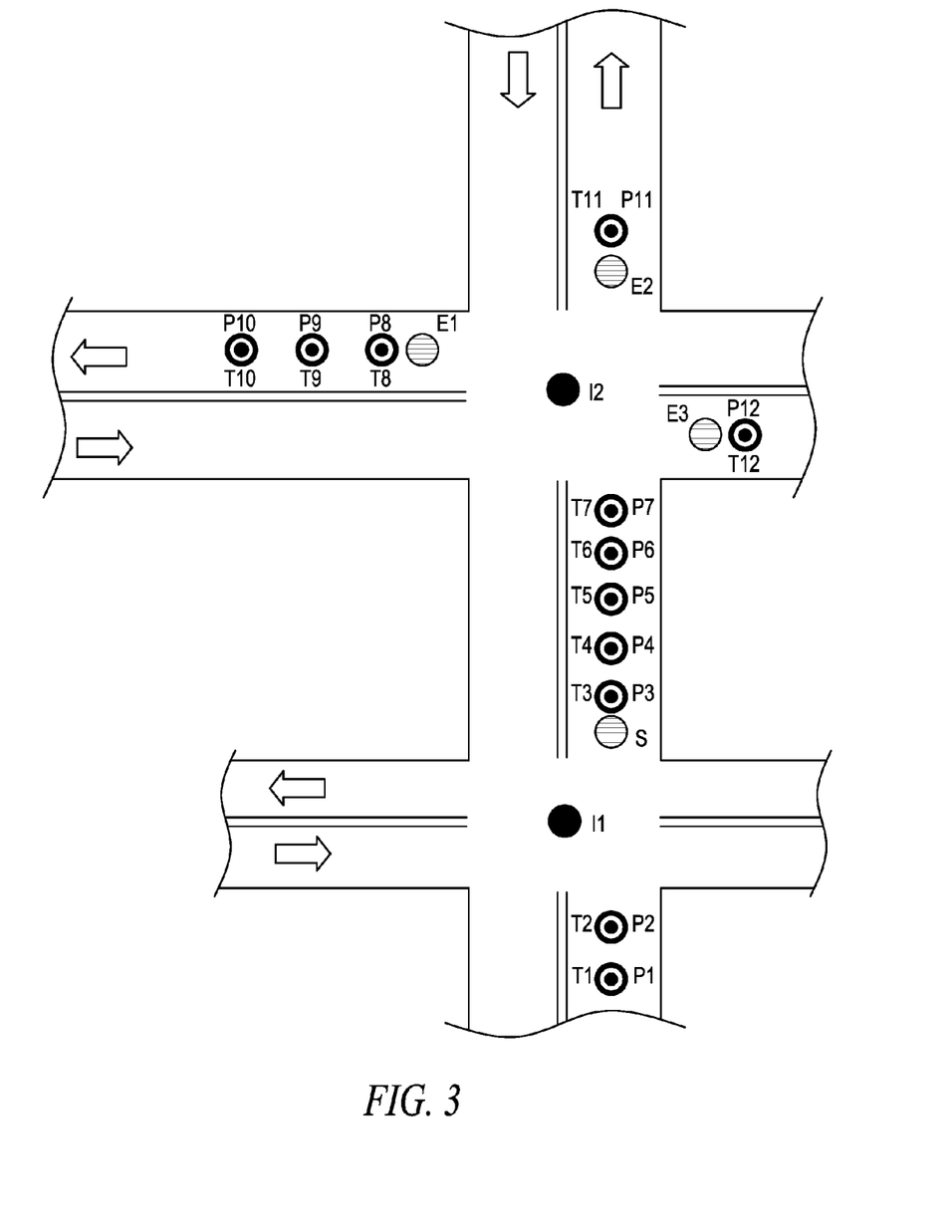
FIG. 3 is a diagrammatic view of available route segments of a route having a plurality of intersections, over which vehicle speed and the arrival time are accurately determined in accordance with the present disclosure.

The vehicle carrying the navigation unit 10 is movable along a route having a plurality of intersections, such as I1 and I2 shown in FIG. 3. The transceiver 24 periodically, if not constantly, sends geographic location or current positional information of the navigation unit 10 to the transceiver 32 and the server 34. This positional information is represented by successive position or trajectory points P1, P2, P3, P4, P5, P6, P7, P8, P9, and P10, in that order, in the event shown in FIG. 3 in which the vehicle crosses intersection I1, and makes a left turn at intersection I2. Successive trajectory times T1, T2, T3, T4, T5, T6, T7, T8, T9, and T10, in that order, are associated with the respective trajectory points P1, P2, P3, P4, P5, P6, P7, P8, P9, and P10. The trajectory times T1 . . . T10 could be determined by the server 34 as the instant in time of the reception of the trajectory points P1 . . . P10 from the navigation unit 10, or could be transmitted from the navigation unit 10 together with its trajectory position in Coordinated Universal Time (UTC) format as a coordinate pair (Pi, Ti). Moreover, if there is no possibility of performing data transfer in real-time (e.g., due to network coverage, etc.), then the navigation unit 10 may transmit a stored sequence of coordinate pairs (Pi, Ti) when the network coverage becomes available.

In the alternate event also shown in FIG. 3 in which the vehicle makes no turn and continues straight through the intersection I2, then the positional information is represented by successive position or trajectory points P1, P2, P3, P4, P5, P6, P7, and P11, in that order; and the corresponding trajectory times are represented by T1, T2, T3, T4, T5, T6, T7, and T11. In the alternate event also shown in FIG. 3 in which the vehicle makes a right turn at the intersection I2, then the positional information is represented by successive position or trajectory points P1, P2, P3, P4, P5, P6, P7, and P12, in that order; and the corresponding trajectory times are represented by T1, T2, T3, T4, T5, T6, T7, and T12.

The server 34 and the route database 36 have divided the route into multiple route segments, each route segment being defined as a portion of the route that starts at a start boundary point located within a predetermined threshold distance past a first intersection, and that ends at an end boundary point located within a predetermined threshold distance past a second intersection. In the case of FIG. 3, the start boundary point is represented by S, which is located immediately after the first intersection I1; the end boundary point of the route segment that includes a left turn is E1; the end boundary point of the route segment that includes no turn is E2; and the end boundary point of the route segment that includes a right turn is E3. Each boundary point E1, E2, and E3 is located immediately after, and as close as possible to, the second intersection I2.

As also shown in FIG. 3, the initial trajectory point P3 is located immediately after, and as close as possible to, the start boundary point S; and the subsequent trajectory point P8 is located immediately after, and as close as possible to, the end boundary point E1 of the route segment that includes a left turn. The subsequent trajectory point P11 is located immediately after, and as close as possible to, the end boundary point E2 of the route segment that includes no turn. The subsequent trajectory point P12 is located immediately after, and as close as possible to, the end boundary point E3 of the route segment that includes a right turn.

Thus, the server 34 and the route database 36 locate a first intersection I1, and the start boundary point S. The transceiver 32 receives positional information of the vehicle in real time at initial trajectory point P3 of the route segment, and the server 34 associates an initial trajectory time T3 with the initial trajectory point P3. The server 34 and the route database 36 also locate a second intersection I2, and all of the end boundary points E1, E2, or E3 of all the available route segments at the second intersection I2. The transceiver 32 receives positional information of the vehicle in real time. If the vehicle makes a left turn at the second intersection I2, then the transceiver 32 receives the subsequent trajectory point P8, and the server 34 now knows that a left turn has been executed. The server 34 associates the subsequent trajectory point P8 with the end point E1, and also associates a subsequent trajectory time T8 with the subsequent trajectory point P8. The server 34 obtains a differential trajectory distance (P8–P3) between the subsequent (P8) and the initial (P3) trajectory points, obtains a differential trajectory time (T8–T3) between the subsequent (T8) and the initial (T3) trajectory times, and determines the route speed of the route segment (S-E1) that includes a left turn by dividing said differential trajectory distance (P8–P3) by said differential trajectory time (T8–T3).

As also shown in FIG. 3, the vehicle need not have made a left turn, but it could have continued past the intersection I2 by going straight to and past the subsequent trajectory point P11 at the subsequent trajectory time T11, in which case the server 34 now knows that no turn has been executed. The server 34 associates the subsequent trajectory point P11 with the end point E2, and also associates a subsequent trajectory time T11 with the subsequent trajectory point P11. The server 34 obtains a differential trajectory distance (P11–P3) between the subsequent (P11) and the initial (P3) trajectory points, obtains a differential trajectory time (T11–T3) between the subsequent (T11) and the initial (T3) trajectory times, and determines the route speed of the route segment (S-E2) that includes no turn by dividing said differential trajectory distance (P11–P3) by said differential trajectory time (T11–T3).

Or, the vehicle could have made a right turn at the intersection I2 to and past the subsequent trajectory point P12 at the subsequent trajectory time T12, in which case the server 34 now knows that a right turn has been executed. The server 34 associates the subsequent trajectory point P12 with the end point E3, and also associates a subsequent trajectory time T12 with the subsequent trajectory point P12. The server 34 obtains a differential trajectory distance obtains a differential trajectory distance (P12–P3) between the subsequent (P12) and the initial (P3) trajectory points, obtains a differential trajectory time (T12–T3) between the subsequent (T12) and the initial (T3) trajectory times, and determines the route speed of the route segment (S-E3) that includes a right turn by dividing said differential trajectory distance (P12–P3) by said differential trajectory time (T12–T3).

In each case, the distance between the initial trajectory point P3 and each subsequent trajectory point P8, P11, or P12 corresponds to the distance between the start boundary point S and each end boundary point E1, E2, or E3, respectively. Hence, the determined route speed for any one of the three available route segments is accurately determined. When other navigation units 10 in other vehicles move over the same one route segment, their route speeds are also accurately determined. All of these route speeds can be averaged, and the average route speed for that particular one route segment can be stored in the database 36.

The average route speed for all the available route segments can also be performed in like manner in advance. This average route speed for all the available route segments can also be stored in the database 36 for subsequent retrieval and use, especially in route optimization. Thus, by retrieval of the stored average route speeds for all the available route segments at the second intersection I2, an optimal route to a destination can be planned, and an accurate arrival time at the destination can be calculated. An optimal route comprised of a plurality of route segments leading to a destination is determined by selecting the route having the minimum total route time calculated as a sum of the individual route times for the individual route segments, each individual route time for each individual route segment being calculated by dividing the length or distance of each individual route segment by the average route speed of the same individual route segment.

Figure 4:
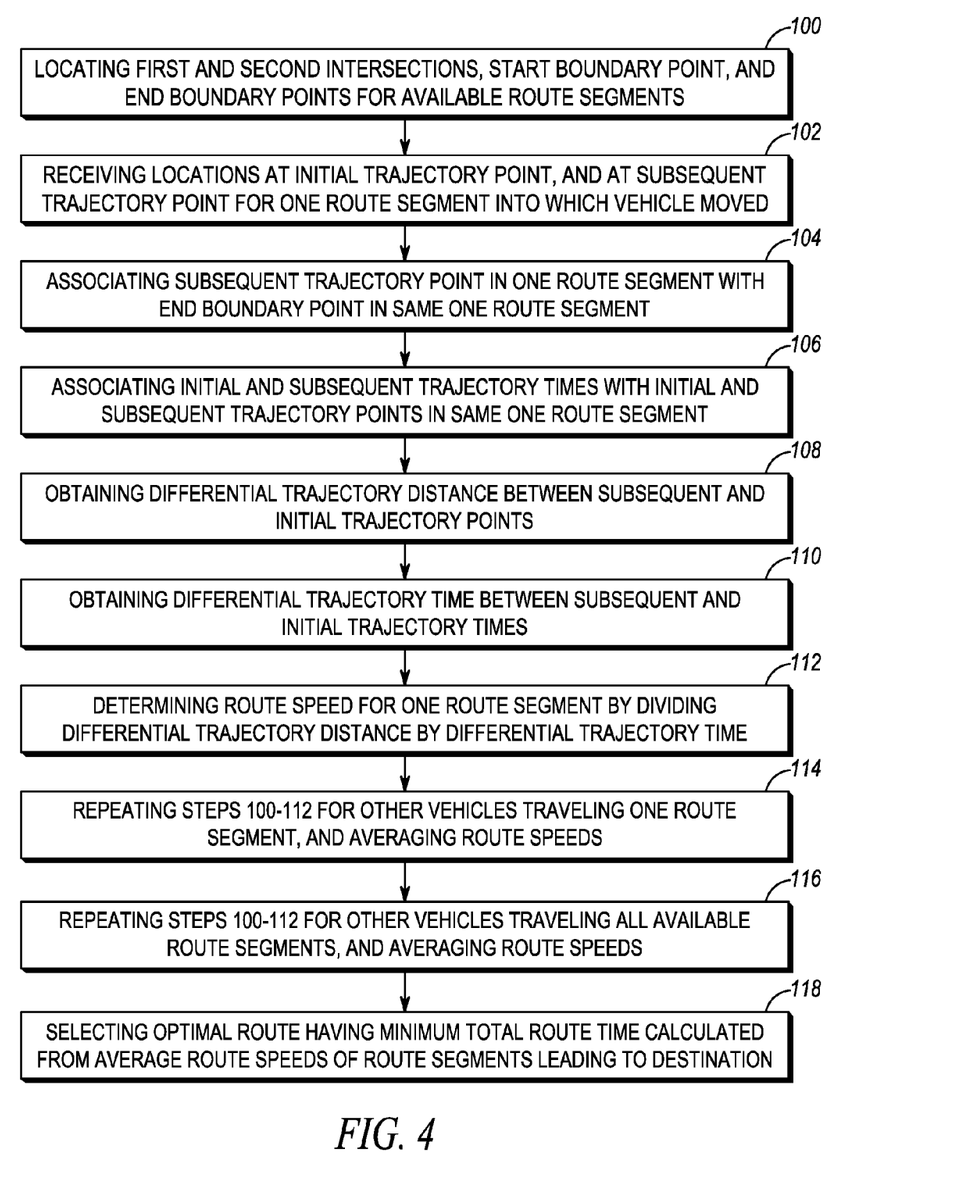
FIG. 4 is a flow chart depicting steps performed during the determination of the vehicle speed and the arrival time.

The method is performed, as shown in the flow chart of FIG. 4, as follows: In step 100, the server 34 and the route database 36 together locate a first of the intersections I1, a start boundary point S for all the available route segments relative to the first intersection I1, a second of the intersections I2 having lanes, e.g., a left turn lane, a no-turn lane, and a right turn lane, and a plurality of end boundary points E1, E2, and E3, one for each available route segment and located in each available lane relative to the second intersection I2. In step 102, the transceiver 24 receives geographic location information of the mobile navigation unit 10 at an initial trajectory point P3 located within a predetermined threshold distance past the located start boundary point S, and at a subsequent trajectory point P8, P11, or P12, depending upon whether the navigation unit 10 has made a left turn, no turn, or a right turn, respectively, into one of the available route segments. In step 104, the server 34 associates the received subsequent trajectory point P8, P11, or P12 in the one route segment with the respective end boundary point E1, E2, or E3 located in the same one route segment. The received subsequent trajectory point P8, P11, or P12 is located within a predetermined threshold distance past the located respective end boundary point E1, E2, or E3. In step 106, the server 34 associates an initial trajectory time T3 with the initial trajectory point P3, and a subsequent trajectory time T8, T11, or T12 with the subsequent trajectory point P8, P11, or P12, located in the same one route segment.

Any one of the lanes at the second intersection I2 is available for the navigation unit 10 to enter. Assuming, for example, that the navigation unit 10 is traveling along the route segment that includes a left turn lane, then the method is still further performed by operating the server 34, in step 108, to obtain a differential trajectory distance between the subsequent (P8) and the initial (P3) trajectory points; in step 110, to obtain a differential trajectory time between the subsequent (T8) and the initial (T3) trajectory times; and, in step 112, to determine the route speed of that one route segment (S-E1) that includes a left turn lane by dividing the differential trajectory distance (P8-P3) obtained for that one route segment by the differential trajectory time (T8-T3) obtained for that one route segment. Hence, the determined route speed for the one route segment that included a left turn lane is accurately determined. In step 114, the above steps 100-112 are repeated for other navigation units 10 in other vehicles that travel over the same one route segment that includes the left turn lane, thus accurately determining a plurality of route speeds. All of these route speeds are averaged in step 114, and the average route speed for that particular one route segment can be stored in the database 36.

In step 116, the above steps are repeated for other navigation units 10 in other vehicles that travel over the available route segments, i.e., those having the no-turn lanes and the right turn lanes. The average route speed for all the other available route segments is thus determined in like manner in advance. The average route speed for all the available route segments can also be stored in the database 36 for subsequent retrieval and use, especially in route optimization. Thus, in step 118, by referring to the stored average route speeds for all the available route segments at the second intersection I2, an optimal route to a destination can be planned, and an accurate arrival time at the destination can be calculated. An optimal route comprised of a plurality of route segments leading to a destination is determined by selecting the route having the minimum total route time calculated as a sum of the individual route times for the individual route segments, each individual route time for each individual route segment being calculated by dividing the length or distance of each individual route segment by the average route speed of the same individual route segment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of determining route speed of a mobile global positioning satellite (GPS) navigation unit along a route comprised of a plurality of route segments across a plurality of intersections, each route segment measured from a first location immediately after a prior intersection along a direction of travel to a second location immediately after a subsequent intersection along the direction of travel, the method comprising:
   locating a first intersection of the plurality of intersections and a second intersection of the plurality of intersections following the first intersection in the direction of travel and along the route, identifying a first intersection start boundary point for all available particular route segments from immediately past the first intersection in the direction of travel to each available end boundary point immediately past each of a plurality of respective navigation options at the second intersection;
   receiving, at an electronic processor of a control unit, geographic location information of the mobile navigation unit at an initial trajectory point located at the start boundary point, and at a subsequent trajectory point at one of the end boundary points associated with a selected one of the available particular route segments;
   identifying, by the electronic processor of a control unit, an initial trajectory time at which the mobile navigation unit was at the initial trajectory point, and a subsequent trajectory time at which the mobile navigation unit was at the subsequent trajectory point;
   obtaining, by the electronic processor of a control unit, a differential trajectory distance between the subsequent and the initial trajectory points;
   obtaining, by the electronic processor of a control unit, a differential trajectory time between the subsequent and the initial trajectory times; and
   determining, by the electronic processor of a control unit, a route speed of the selected one of the available particular route segments along the route by dividing the differential trajectory distance by the differential trajectory time.

2. The method of claim 1, and supporting the mobile navigation unit in a vehicle for joint movement therewith.

3. The method of claim 1, and repeating the method for a plurality of other navigation units to obtain a plurality of determined route speeds for the selected one of the available particular route segments; and averaging the plurality of determined route speeds to obtain an average route speed for the selected one of the available particular route segments.

4. The method of claim 3, and repeating the method for a plurality of other navigation units to obtain a plurality of determined route speeds for each of the available particular route segments corresponding to each of the plurality of respective navigation options at the second intersection; and averaging the respective plurality of determined route speeds to obtain average route speeds corresponding to each of the available particular route segments.

5. The method of claim 4, and subsequently determining an optimal route comprised of a plurality of the route segments from a new source to a new destination by selecting the route segments between the new source and the new destination determined to have a minimum total route time calculated as a sum of individual route times for individual route segments, the selected route segments including the selected one of the available particular route segments.

6. The method of claim 1, wherein the plurality of respective navigation options at the second intersection include turning right via a right turn lane, turning left via a left turn lane, and driving straight via a non-turning lane.

7. A system for determining route speed of a mobile global positioning satellite (GPS) navigation unit movable along a route comprised of a plurality of route segments across a plurality of intersections, each route segment measured from a first location immediately after a prior intersection along a direction of travel to a second location immediately after a subsequent intersection along the direction of travel, the system comprising:
   a server for locating a first intersection of the plurality of intersections and a second intersection of the plurality of intersections following the first intersection in the direction of travel and along the route, a first intersection start boundary point for all available particular route segments from immediately past the first intersection in the direction of travel to each available end boundary point immediately past each of a plurality of respective navigation options at the second intersection;
   a transceiver for receiving geographic location information of the mobile navigation unit at an initial trajectory point located at the start boundary point, and at a subsequent trajectory point at one of the end boundary points associated with a selected one of the available particular route segments;

the server being operative for identifying an initial trajectory time at which the mobile navigation unit was at the initial trajectory point, and a subsequent trajectory time at which the mobile navigation unit was at the subsequent trajectory point;

the server being operative for obtaining a differential trajectory distance between the subsequent and the initial trajectory points;

the server being operative for obtaining a differential trajectory time between the subsequent and the initial trajectory times; and the server being operative for determining a route speed of the selected one of the available particular route segments along the route by dividing the differential trajectory distance by the differential trajectory time.

8. The system of claim 7, wherein the mobile navigation unit is supported in a vehicle for joint movement therewith.

9. The system of claim 7, wherein the server and the transceiver are operative with a plurality of other navigation units to obtain a plurality of determined route speeds for the selected one of the available particular route segments, and for averaging the plurality of determined route speeds to obtain an average route speed for the selected one of the available particular route segments.

10. The system of claim 9, wherein the server and the transceiver are operative with a plurality of other navigation units to obtain a plurality of determined route speeds for each of the available particular route segments corresponding to each of the plurality of respective navigation options at the second intersection, and for averaging the respective plurality of determined route speeds to obtain average route speeds corresponding to each of the available particular route segments.

11. The system of claim 10, and a database for storing the average determined route speed for each route segment, and wherein the server is operative to subsequently determine an optimal route comprised of a plurality of the route segments from a new source to a new destination by selecting the route segments between the new source and the new destination determined to have a minimum total route time calculated as a sum of individual route times for individual route segments, the selected route segments including the selected one of the available particular route segments.

12. The system of claim 7, wherein the wherein the plurality of respective navigation options at the second intersection include turning right via a right turn lane, turning left via a left turn lane, and driving straight via a non-turning lane.

* * * * *